(12) United States Patent
Kinoshita (10) Patent No.: US 7,748,625 B2
(45) Date of Patent: Jul. 6, 2010

(54) MAGNETIC INK CHARACTER READING APPARATUS

(75) Inventor: Yoshiaki Kinoshita, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 911 days.

(21) Appl. No.: 11/216,247

(22) Filed: Aug. 30, 2005

(65) Prior Publication Data

US 2006/0043182 A1   Mar. 2, 2006

(30) Foreign Application Priority Data

Aug. 30, 2004   (JP)  ............................. 2004-250562

(51) Int. Cl.
*G06K 7/08*   (2006.01)
(52) U.S. Cl. ...................... 235/449; 235/493
(58) Field of Classification Search ................ 235/449, 235/493, 494
See application file for complete search history.

(56) References Cited

U.S. PATENT DOCUMENTS 5,341,408 A * 8/1994 Melcher et al. ................ 377/8
5,959,279 A 9/1999 Komatsu

FOREIGN PATENT DOCUMENTS

| JP | 60-144256 | 7/1985 |
|---|---|---|
| JP | 09-245119 | 9/1997 |
| JP | 9-282410 | 10/1997 |
| JP | 2000-298804 | 10/2000 |
| JP | 3421104 | 4/2003 |
| JP | 2004-206362 | 7/2004 |

* cited by examiner

*Primary Examiner*—Daniel A Hess
(74) *Attorney, Agent, or Firm*—Nutter McClennan & Fish LLP; John J. Penny, Jr.; Rory P. Pheiffer (57) ABSTRACT

A magnetic ink character reading apparatus has a magnetic detection unit for detecting magnetic ink characters on the check and generating magnetic detection signals, a noise data generator for generating magnetic noise data by accumulating magnetic detection signals before the check passes the magnetic detection unit, and a magnetic noise cancellation unit for removing magnetic noise by subtracting the magnetic noise data from the magnetic detection signals.

15 Claims, 11 Drawing Sheets

MAGNETIC INK CHARACTER READING APPARATUS

BACKGROUND OF THE INVENTION

1. Field of Technology

The present invention relates to a magnetic ink character reading apparatus that acquires magnetic ink character data by reading magnetic ink characters or other magnetic pattern, and relates more particularly to improving magnetic noise cancellation performance.

2. Description of Related Art

Check processing machines that read magnetic ink recognition characters (MICR characters) printed on checks are commonly used in financial institutions and other businesses. Check processing machines with a media transportation mechanism typically use a stepping motor to convey the checks past a magnetic head to recognize the magnetic ink characters. Magnetic noise cancellation is essential in such machines in order to achieve a high character recognition rate.

A major source of magnetic noise is the stepping motor used in the transportation mechanism. Addressing this problem, Japanese Unexamined Patent Appl. Pub. H9-282410 teaches a method for canceling magnetic noise. More specifically, this method first acquires magnetic signals detected when MICR characters are not detected as magnetic noise synchronized to the drive pulse through multiple cycles and determines the median as a data correction value. When reading the magnetic ink characters, this correction value is then subtracted from the magnetic detection signal, thereby removing the magnetic noise from the MICR detection signal.

The transportation mechanism also generally has a mechanism for detecting double feeding, that is, two or more overlapping checks being conveyed together. Japanese Unexamined Patent Appl. Pub. S60-144256 teaches technology for monitoring double feeding by using a lever that is pushed into the transportation path by a spring. When a check is conveyed and passes under the lever, the lever is raised according to the thickness of the check. This displacement of the lever is detected by a photodetector to measure the check thickness and thereby detect double feeding.

Checks read by the foregoing check processing machines may be wrinkled or soiled, and the magnetic detection sensitivity of the foregoing check processing machines is therefore preferably increased in order to obtain a sufficiently high character recognition rate even with checks in poor condition, but magnetic noise from weak sources other than the stepping motor becomes a problem as the sensitivity of the magnetic head rises. Furthermore, as the size of such check processing machines has been reduced, it has become increasingly difficult to assure sufficient space between the magnetic head and other electronic components, thus exacerbating problems related to magnetic noise.

Figure 11A:
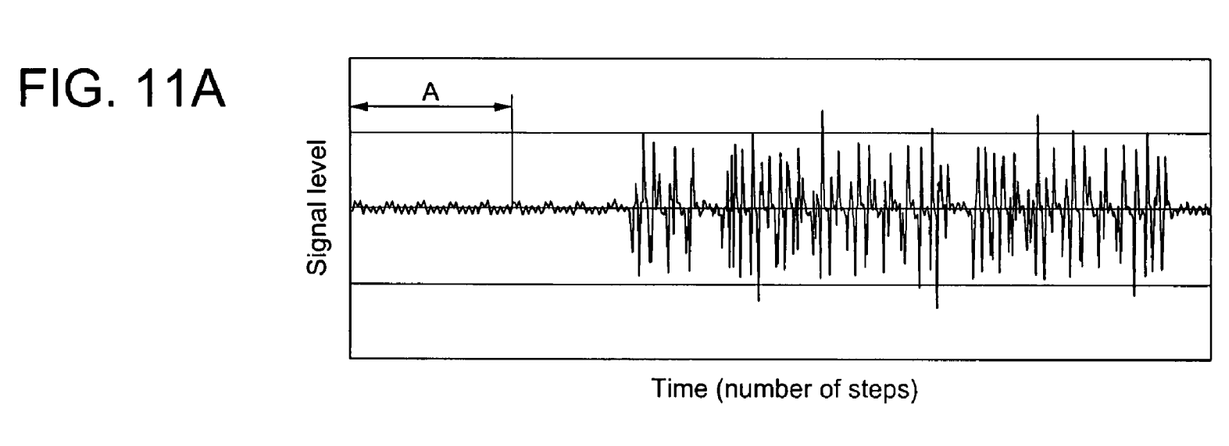
FIG. 11A is a waveform showing an example of the magnetic detection signal before the magnetic noise cancellation process.
Figure 11B:
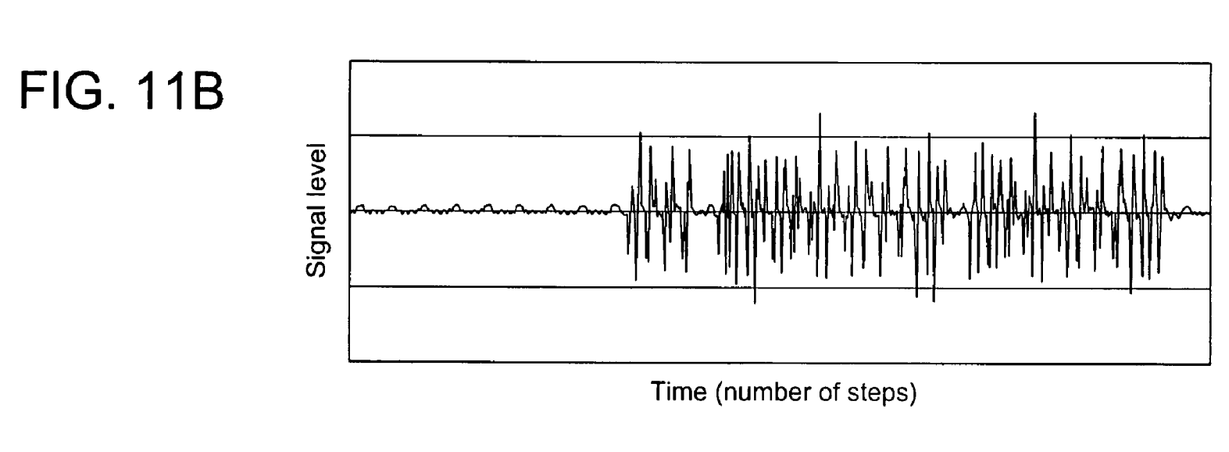
FIG. 11B is a waveform diagram showing the magnetic detection signal shown in FIG. 11A after removing magnetic noise from the stepping motor.

FIG. 11A is a waveform diagram showing an example of the magnetic detection signal before processing to remove magnetic noise. FIG. 11B shows the waveform of the signal shown in FIG. 11A after removing magnetic noise from the stepping motor. As will be known from these figures, magnetic noise remains even after magnetic noise from the stepping motor has been removed.

The primary component of this residual magnetic noise has a cycle with a period different from the control cycle of the stepping motor, and our research has shown that the magnetic head picks up magnetism from the drive current of the LED used in the photodetector of the double feed detection mechanism.

At least one embodiment of the present invention is thus directed to improving the magnetic noise cancellation performance and increasing the character recognition rate in a magnetic ink character reading apparatus having a media transportation mechanism that conveys a recording medium by means of a stepping motor, and a paper thickness detection mechanism for detecting paper thickness by means of a photodetector in the media transportation mechanism.

SUMMARY

One aspect of at least one embodiment of the present invention is a magnetic ink character reading apparatus having a transportation mechanism for conveying paper having magnetic ink characters printed thereon by means of a stepping motor; a double feed detection mechanism for detecting double feeding by detecting the thickness of the paper using a photodetector; a magnetic detection unit for detecting magnetic ink characters on the paper and generating magnetic detection signals; a magnetic noise data generating unit for generating magnetic noise data by accumulating magnetic detection signals before the paper passes the magnetic detection unit; and a magnetic noise cancellation unit for removing magnetic noise by subtracting the magnetic noise data from the magnetic detection signals.

Preferably, the magnetic noise data is generated based on the control period of the stepping motor and the control period of the photodetector.

Yet further preferably, the period of the magnetic noise data is equal to the least common multiple of the control period of the stepping motor and the control period of the photodetector.

Yet further preferably, the magnetic noise data is generated by acquiring a plurality of magnetic noise data from magnetic detection signals before the paper passes the magnetic detection unit, and then acquiring an average of the plural magnetic noise data at each detection position starting from the first magnetic noise data.

Another aspect of at least one embodiment of the present invention is a magnetic ink character reading method having steps of: conveying paper by means of a stepping motor; detecting paper thickness by means of a photodetector; detecting magnetic ink characters on the paper and generating magnetic detection signals by means of a magnetic detection unit; generating magnetic noise data by accumulating magnetic detection signals before the paper passes the magnetic detection unit; and removing magnetic noise by subtracting the magnetic noise data from the magnetic detection signals.

Preferably, the magnetic noise data is generated based on the control period of the stepping motor and the control period of the photodetector.

Yet further preferably, the period of the magnetic noise data is equal to the least common multiple of the control period of the stepping motor and the control period of the photodetector.

Yet further preferably, the magnetic noise data is generated by acquiring a plurality of magnetic noise data from magnetic detection signals before the paper passes the magnetic detection unit, and then acquiring an average of the plural magnetic noise data at each detection position starting from the first magnetic noise data.

In addition to removing magnetic noise from stepping motors, at least one embodiment of the invention thus also removes the residual magnetic noise that is introduced by the LED drive current of the double feed detection mechanism and is left in the magnetic detection signal by conventional magnetic noise cancellation processes. As a result, the magnetic ink character recognition rate can be improved. This embodiment of the present invention thus can be advantageously used in compact hybrid apparatuses in which assuring sufficient distance between the magnetic head and other electronic components is difficult.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

Figure 1:
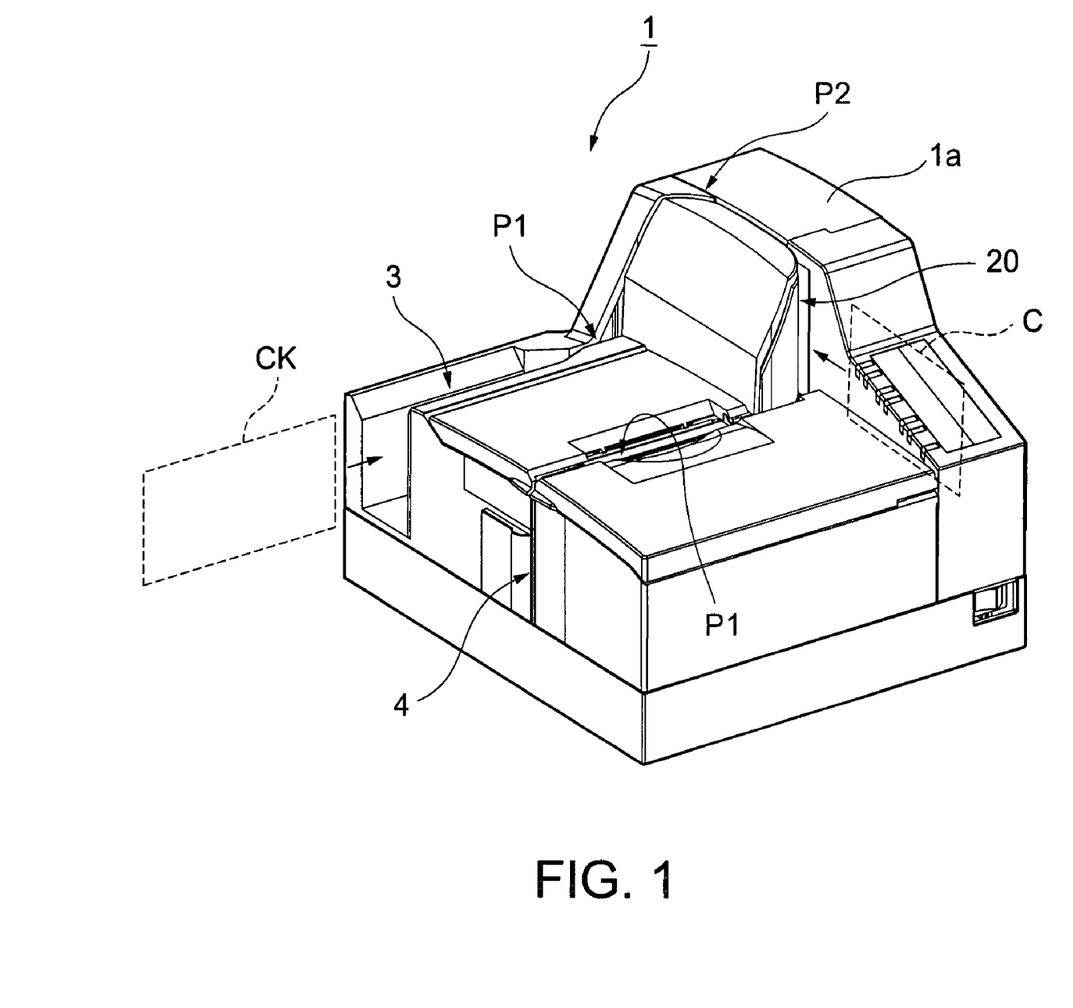
FIG. 1 is an oblique view showing a hybrid processing apparatus according to a preferred embodiment of the present invention.
Figure 2:
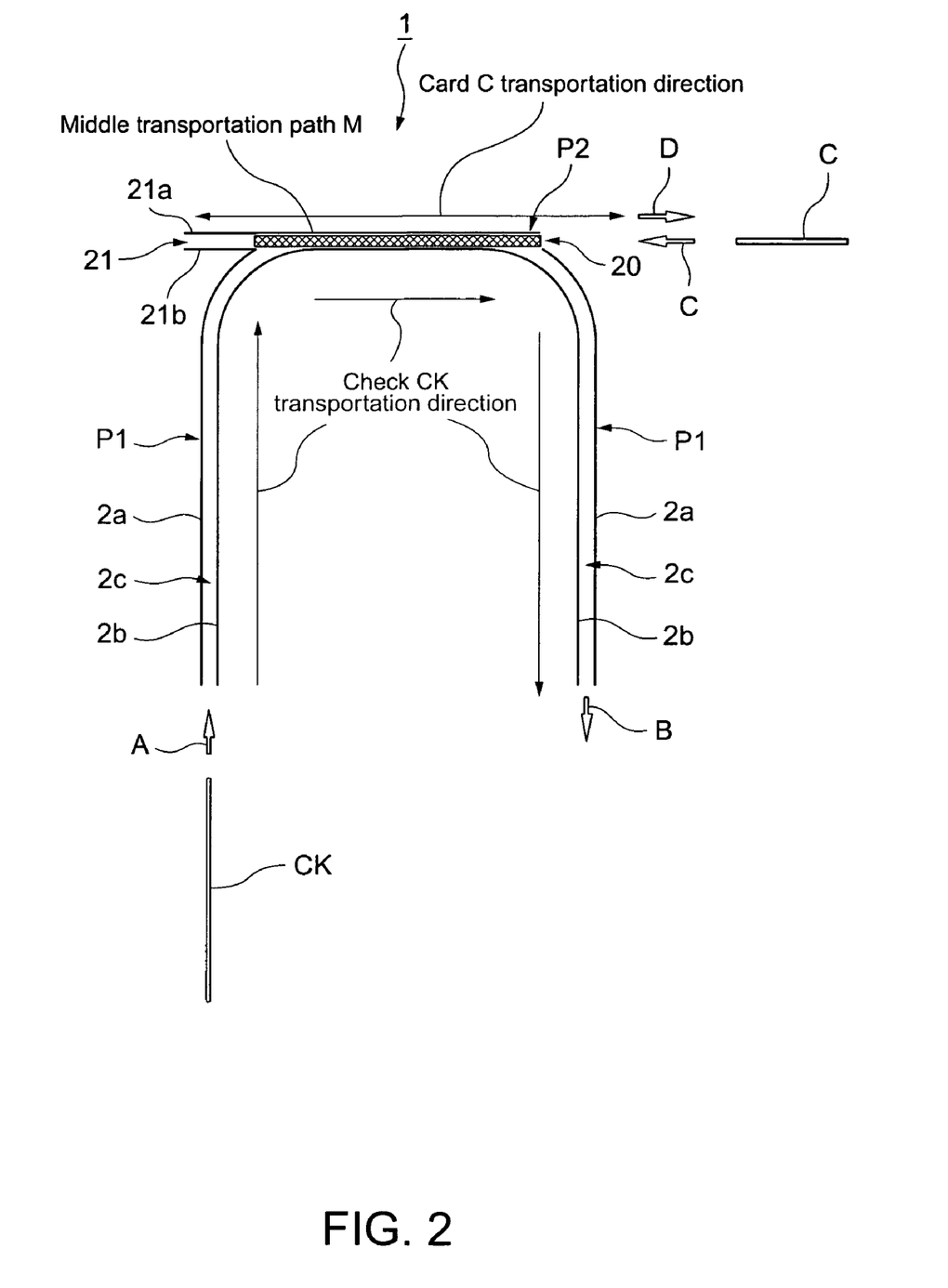
FIG. 2 is a schematic diagram showing the paper transportation path in the hybrid processing apparatus shown in FIG. 1.
Figure 3:
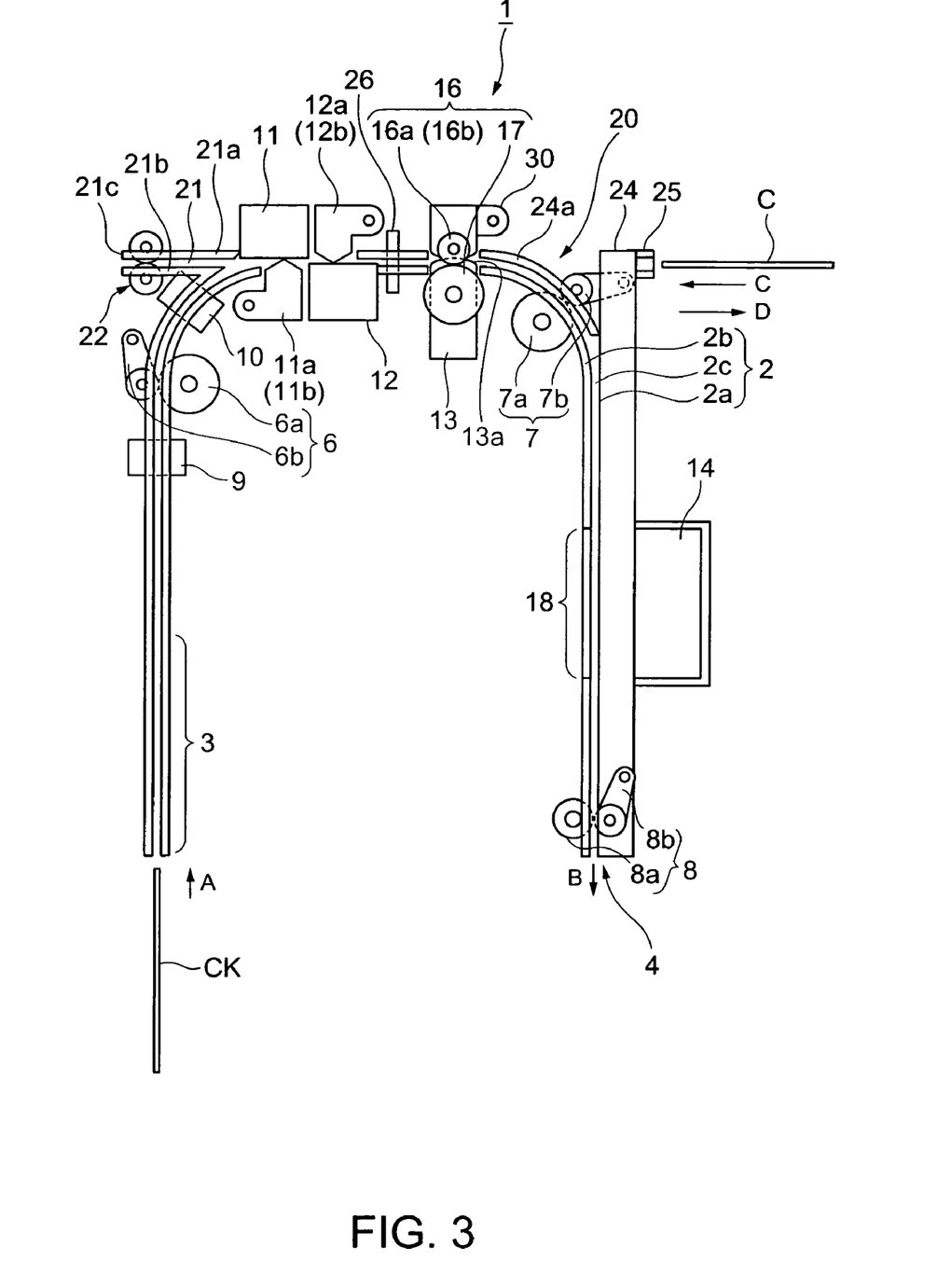
FIG. 3 is a schematic diagram showing the internal construction of the hybrid processing apparatus shown in FIG. 1.
Figure 4:
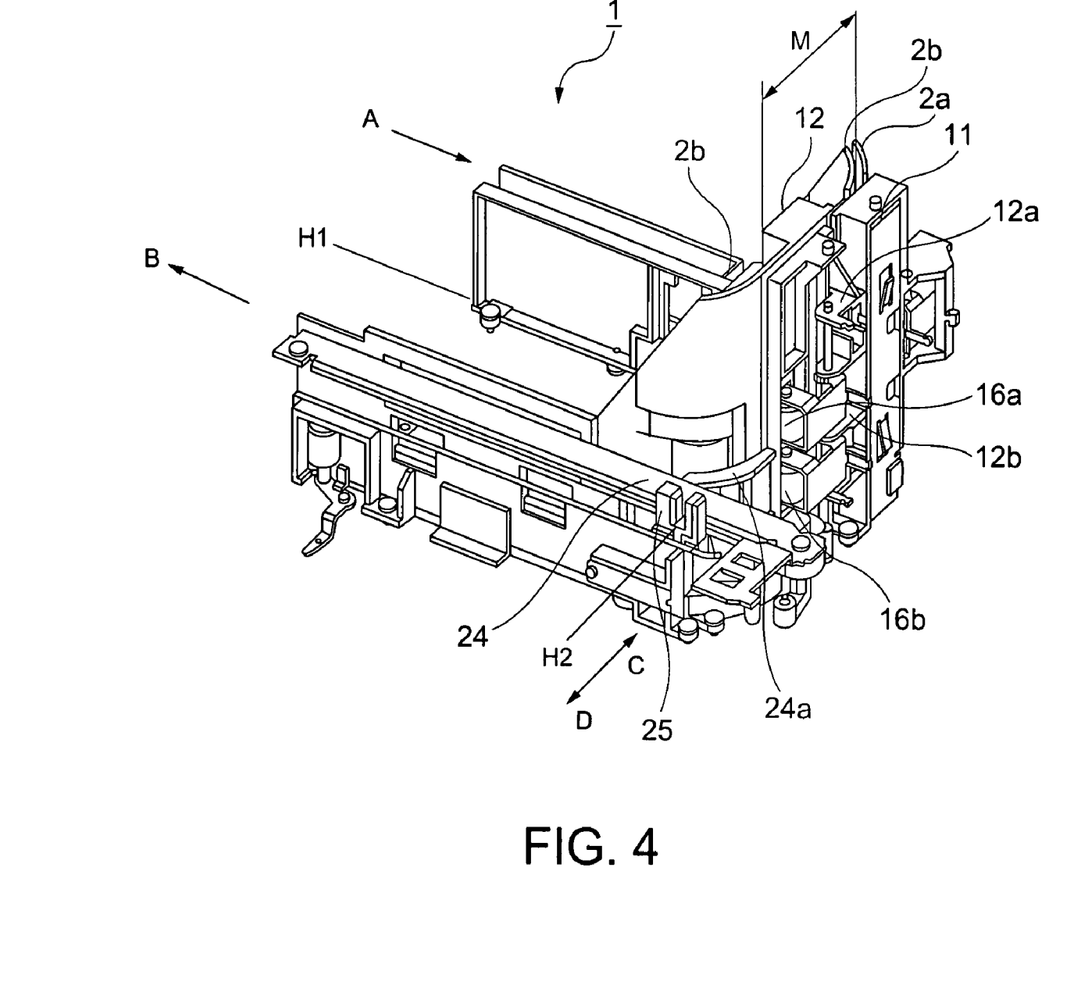
FIG. 4 is an oblique view of the hybrid processing apparatus shown in FIG. 1 with the case removed.
Figure 5:
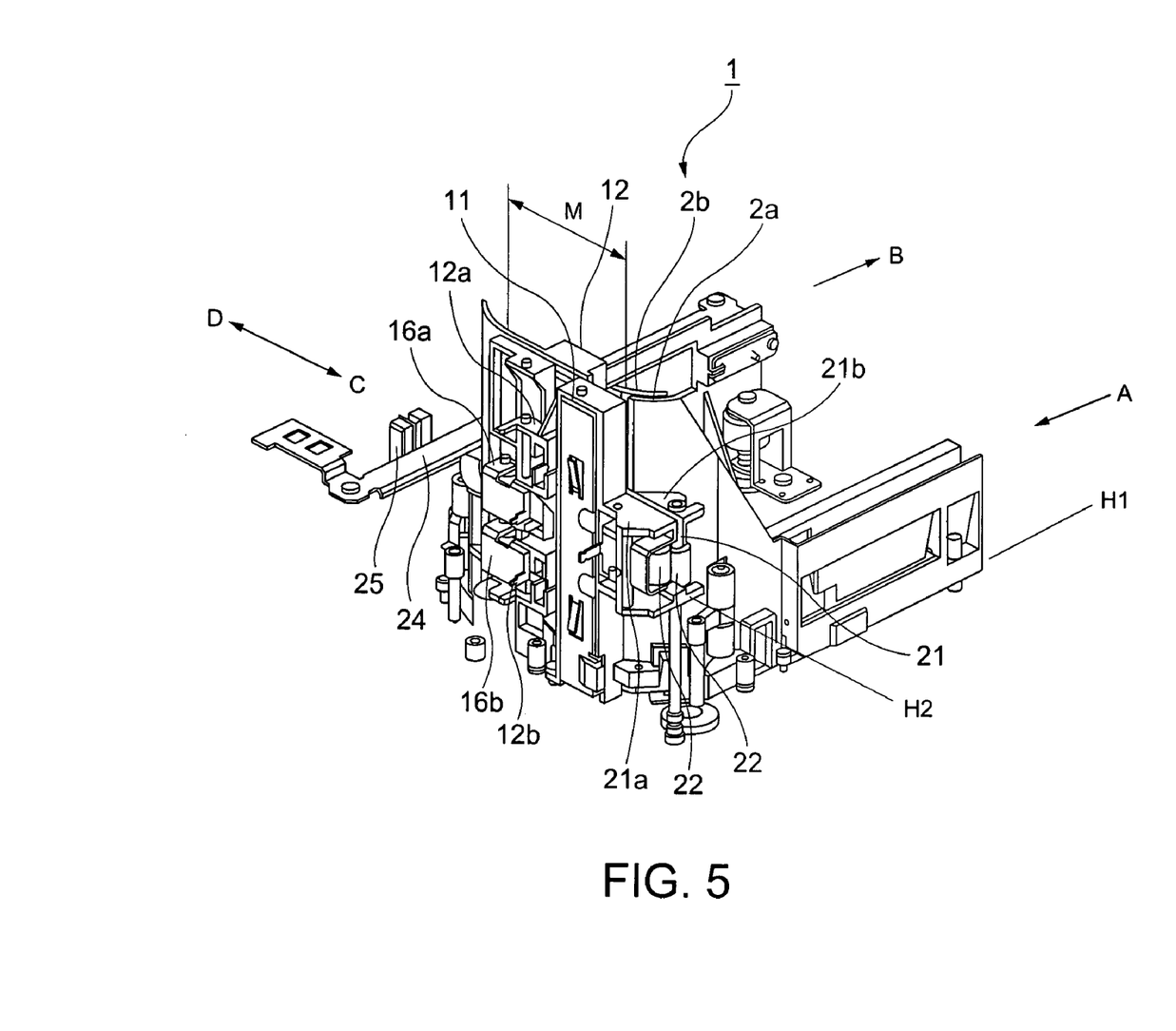
FIG. 5 is another oblique view of the hybrid processing apparatus shown in FIG. 1 with the case removed.

FIG. 1 is an oblique view showing a hybrid processing apparatus according to a preferred embodiment of the present invention. FIG. 2 is a schematic diagram showing the paper transportation path in the hybrid processing apparatus, and FIG. 3 is a schematic diagram showing the internal construction of the hybrid processing apparatus from above. FIG. 4 and FIG. 5 are oblique views from opposite sides of the hybrid processing apparatus shown with the case removed.

As shown in FIG. 1, a hybrid processing apparatus 1 according to this embodiment of the invention has a paper supply unit 3 in which a first medium is loaded, a first media transportation path P1 formed in the case 1a for conveying a check CK as the first medium from the paper supply unit 3, and a second media transportation path P2 formed in the case 1a for conveying a card C as a second medium inserted from a card insertion slot 20. The hybrid processing apparatus 1 more specifically combines the functions of an image scanner, a MICR reader, and a printer to scan an image of the check CK, read magnetic ink characters printed on the check CK, and print on the check CK while conveying the check CK through first media transportation path P1, and to scan an image of the card C while conveying the card C through second media transportation path P2.

The construction of the hybrid processing apparatus 1 is described more specifically below.

As shown in FIG. 2, media transportation path P1 has a substantially U-shaped configuration for conveying checks CK and similar media, and media transportation path P2 is straight for conveying stiff cards C. The first media transportation path P1 and second media transportation path P2 share the portion corresponding to the bottom of the U-shaped configuration, and this shared portion is referred to herein as middle transportation path M. Reading and scanning devices are disposed to this middle transportation path M as further described below.

As also shown in FIG. 2, the first media transportation path P1 is formed by an outside guide 2a and an inside guide 2b forming a transportation space 2c through which a check CK is conveyed between the outside guide 2a and inside guide 2b. A check CK is inserted to the first media transportation path P1 in the direction of arrow A in FIG. 3 through the paper supply unit 3. A plurality of checks CK can be loaded at the same time to the paper supply unit 3, and the paper supply unit 3 feeds the checks CK one at a time into the first media transportation path P1.

The transportation mechanism disposed in the first media transportation path P1 for conveying checks CK includes first transportation rollers 6 on the upstream side of the middle transportation path M, middle transportation rollers 16 disposed in the middle transportation path M, and second transportation rollers 7 on the downstream side of the middle transportation path M.

The first transportation rollers 6 include a drive roller 6a and a pressure roller 6b disposed opposite the drive roller 6a with the first media transportation path P1 therebetween. The second transportation rollers 7 include a drive roller 7a and a pressure roller 7b disposed opposite the drive roller 7a with the first media transportation path P1 therebetween.

As shown in FIG. 3, the middle transportation rollers 16 include a lower pressure roller 16b disposed to the bottom portion of the first media transportation path P1, an upper pressure roller 16a disposed above the lower pressure roller 16b, and a drive roller 17 disposed opposite the lower pressure roller 16b and upper pressure roller 16a with the first media transportation path P1 therebetween.

These transportation rollers are driven rotationally by a stepping motor not shown to convey a check CK. The stepping motor is a pulse motor whereby the angle of rotation and speed are controlled by pulse signals.

A check CK fed into the first media transportation path P1 is conveyed by the first transportation rollers 6, middle transportation rollers 16, and second transportation rollers 7 through the middle transportation path M as shown in FIG. 3, and is then discharged by the discharge rollers 8 from the paper exit 4. As shown in FIG. 4, the bottom of the first media transportation path P1 is at a height H1, and checks CK are conveyed at height H1 along the bottom of the first media transportation path P1, including the middle transportation path M.

If the width (height) of the check CK is less than a specific dimension, the check CK is conveyed through the middle transportation rollers 16 by the lower pressure roller 16b and drive roller 17. If the width of the check CK is greater than or equal to this specific dimension, the check CK is conveyed by both the upper pressure roller 16a and lower pressure roller 16b and the drive roller 17.

As shown in FIG. 2 and FIG. 3, the second media transportation path P2 is composed of the middle transportation path M, and a card insertion slot 20 and card reversing path 21 communicating with opposite ends of the middle transportation path M.

The card insertion slot 20 is an opening for inserting a card C to the middle transportation path M. As shown in FIG. 3 and FIG. 4, bottom guides 24 and 24a are disposed below the card insertion slot 20. These bottom guides 24 and 24a are part of the outside guide 2a and hold the bottom edge of the card C at a height H2. A card C is thus inserted to the middle transportation path M guided by bottom guide 24, and is conveyed at height H2. The bottom of the second media transportation path P2 is thus held at height H2 as determined by the bottom guides 24 and 24a. The direction of travel of a check CK conveyed at height H1 through the first media transportation path P1 is changed by bottom guide 24a and the check CK is thus conveyed towards the paper exit 4.

The upper pressure roller 16a is disposed at a position above the height H2 of the second media transportation path P2, and a card C is thus conveyed through the middle transportation path M by the upper pressure roller 16a and drive roller 17.

The card reversing path 21 is formed by straight guides 21a and 21b extending in a straight line to the left of the middle transportation path M as seen in FIG. 2. Forward/reversing transportation rollers 22 are disposed near the end portion 21c of this card reversing path 21. These forward/reversing transportation rollers 22 convey a card C delivered from the middle transportation path M until the card C extends a specific length beyond the end portion 21c of the card reversing path 21, and then deliver the card C overhanging from the end portion 21c back into the middle transportation path M.

More specifically, a card C inserted to the middle transportation path M from the card insertion slot 20 is conveyed by the upper pressure roller 16a and drive roller 17 to the card reversing path 21. The card C is then reversed by the forward/reversing transportation rollers 22 and conveyed from the card reversing path 21 back into and through the middle transportation path M and discharged from the card insertion slot 20. The card C is conveyed through the second media transportation path P2 during this time with the bottom edge held at height H2. The height H2 of the second media transportation path P2 is at a higher position than the height H1 of the first media transportation path P1. A card C is thus conveyed through the middle transportation path M at an elevation above the height at which a check CK is conveyed.

By thus conveying checks CK and cards C at different elevations, the present invention can convey different types of media through a U-shaped first media transportation path and a straight second media transportation path without using a special switching mechanism. Transportation of checks CK and cards C in the present invention is thus as described above.

A first image scanning sensor 11 and second image scanning sensor 12 for scanning media are disposed to the middle transportation path M. The first image scanning sensor 11 and second image scanning sensor 12 are both contact image sensor (CIS) scanners that emit light to one side of the check CK or card C traveling through the middle transportation path M and then detect the light reflected from the check CK or card C. The first image scanning sensor 11 and second image scanning sensor 12 acquire a two-dimensional image of the check CK or card C traveling through the middle transportation path M by reading the check CK or card C one line at a time.

A BOF (bottom of form) detector 9 and a TOF (top of form) detector 10 for detecting the trailing and leading edges of a check CK are also disposed to the first media transportation path P1. More specifically, the BOF detector 9 is located between the paper supply unit 3 and first transportation rollers 6 for detecting when a check CK is inserted from the paper supply unit 3 and detecting the trailing edge of the check CK by detecting when the check CK passes downstream from the BOF detector 9. The TOF detector 10 is located between the first transportation rollers 6 and first image scanning sensor 11, and detects the leading edge of the check CK. The length of the check CK can thus be accurately measured as a result of the BOF detector 9 and TOF detector 10 by detecting the trailing edge and leading edge of the check CK.

Processing a check CK in a hybrid processing apparatus 1 according to this embodiment of the invention is controlled according to detection of the check by the BOF detector 9 and TOF detector 10. More specifically, starting and stopping reading a check CK by the first image scanning sensor 11 and second image scanning sensor 12 is controlled based on output from the BOF detector 9 and TOF detector 10. Note that one of the image scanning sensors 11 or 12 can be used as a detector for sensing the leading edge of the check CK, in which case the TOF detector 10 can be omitted.

A print head 14 is also disposed to the straight portion of the first media transportation path P1 between the second transportation rollers 7 and discharge rollers 8. This print head 14 is used for printing an endorsement on the back of a check CK, and can also be used to print the front of the check CK.

A BOC (bottom of card) detector 25 and TOC (top of card) detector 26 for respectively detecting the trailing edge and leading edge of a card C are disposed to the second media transportation path P2. The BOC detector 25, which is located near the card insertion slot 20, detects a card C inserted from the card insertion slot 20, and senses the trailing edge of the card C by detecting when the card C has passed downstream from the BOF detector 9. The TOC detector 26 is located between the middle transportation rollers 16 and second image scanning sensor 12, and detects the leading edge of the card C. The length of the card C can thus be accurately measured as a result of the BOC detector 25 and TOC detector 26 detecting the trailing edge and leading edge of the card C. Processing a card C is controlled in the hybrid processing apparatus 1 according to this embodiment of the invention based on detection of the card C by the BOC detector 25 and TOC detector 26. More specifically, starting and stopping reading the card C by the first image scanning sensor 11 or second image scanning sensor 12 is controlled based on output from the BOC detector 25 and TOC detector 26. Note that one of the image scanning sensors 11 or 12 can be used as a detector for sensing the leading edge of the card C, in which case the TOC detector 26 can be omitted.

Figure 7:
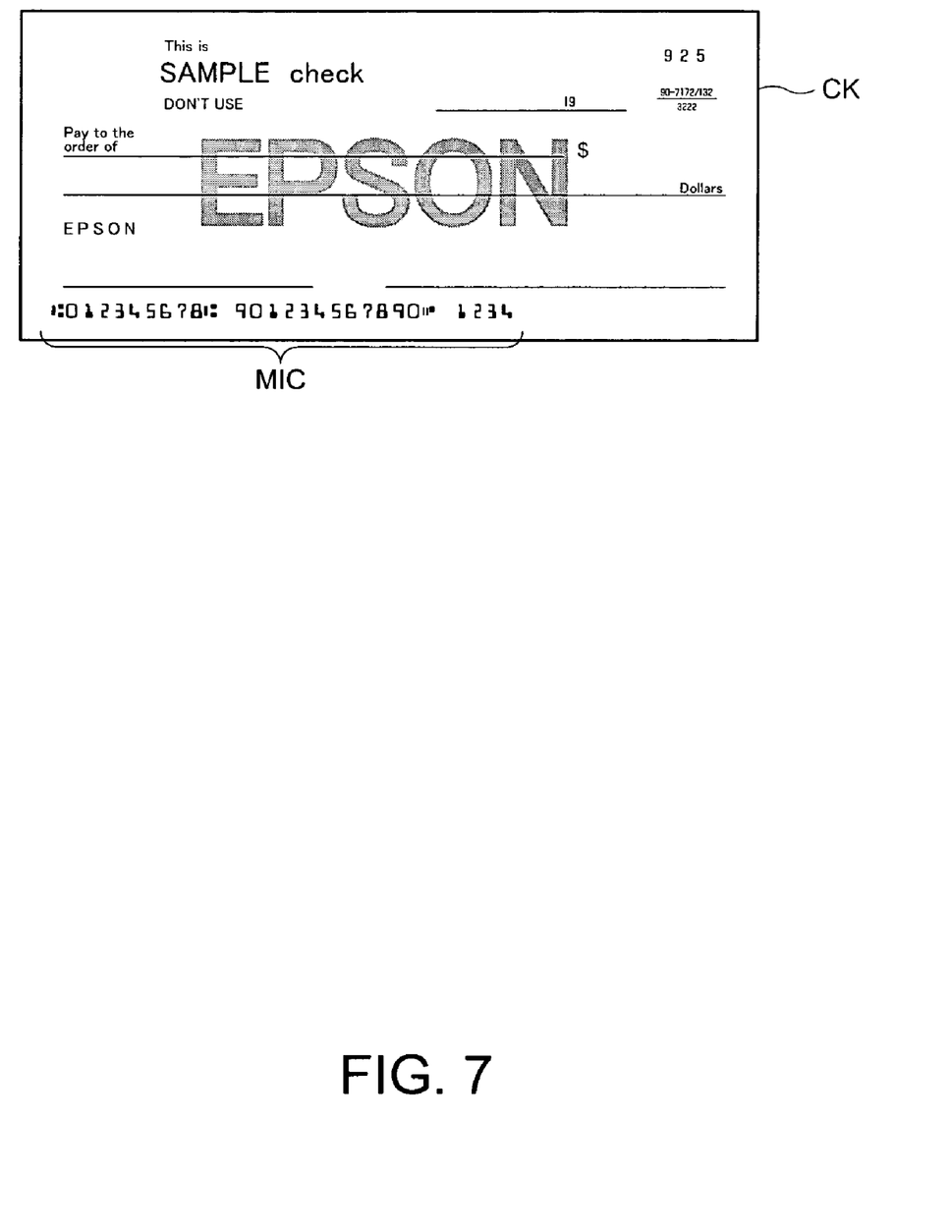
FIG. 7 shows a typical check.

A MICR (magnetic ink character reader) 13 is disposed below the drive roller 17. This MICR 13 is a sensor for reading the magnetic ink characters MIC printed in magnetic ink in a specific area of a check CK as shown in FIG. 7. A pressure lever 30 disposed opposite the MICR 13 with the middle transportation path M therebetween presses the surface of the check CK to the MICR 13 for reading.

Figure 6:
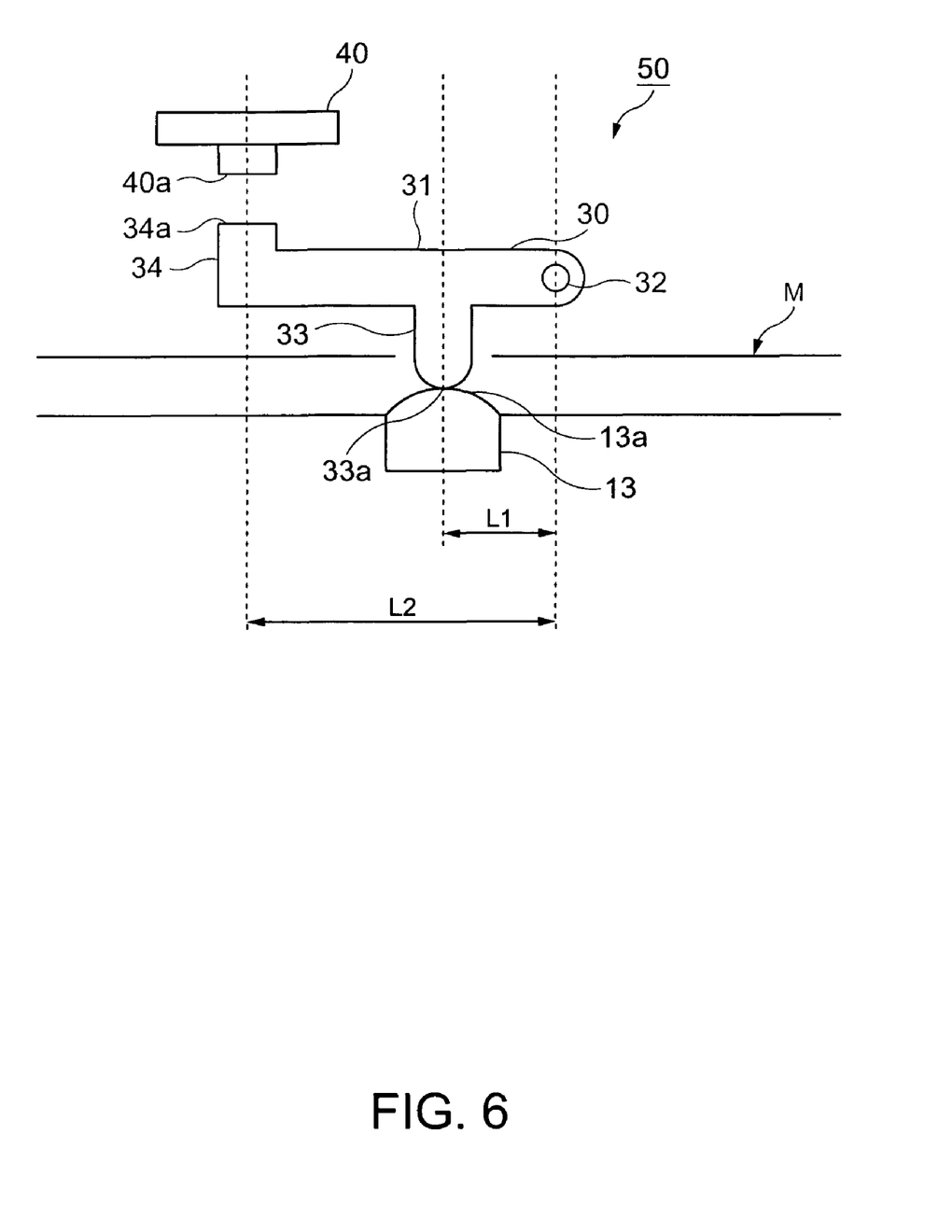
FIG. 6 is a schematic diagram showing a double feed detection mechanism according to the present invention.

The structure of the paper thickness detection mechanism is described next. FIG. 6 is a schematic diagram showing the paper thickness detection mechanism 50 according to this embodiment of the invention.

As shown in FIG. 6 the pressure lever 30 has a long main arm 31 that pivots in a plane perpendicular to the check transportation surface of the middle transportation path M on a pin 32 at one end portion of the main arm 31. A pressure boss 33 is formed integrally to the main arm 31 projecting toward the middle transportation path side. The force of a pressure spring not shown urges the pressure boss 33 toward the MICR 13, and the contact surface 33a of the pressure boss 33 contacts the surface 13a of the MICR 13 when a check CK is not intervening.

The contact surface 33a of the pressure lever 30 is a rigid body that is not displaced or deformed by pressure on the pressure boss 33 in this embodiment of the invention. When the contact surface 33a of the pressure boss 33 contacts the MICR 13, the long axis of the main arm 31 of the pressure lever 30 is fixed substantially parallel to the middle transportation path M through which the check CK is conveyed.

A curved portion 34 bent substantially 90 degrees away from the middle transportation path M is positioned at the distal end of the main arm 31. A paper thickness sensor 40 is disposed opposite the end surface 34a of the curved portion 34 with a specific distance therebetween.

The paper thickness sensor 40 detects displacement of the end surface 34a, i.e., the detection surface, of the curved portion 34, and more specifically is an optical sensor for measuring the distance to the end surface 34a by, for example, emitting light from an LED not shown to the end surface 34a and detecting light reflected from the end surface 34a by means of a photodetector 40a.

The pressure boss 33 is formed so that L2>L1 where length L1 is the distance from the center of rotation of the pin 32 to a line passing through the distal end of the pressure boss 33 parallel to the direction in which the pressure boss 33 protrudes, and length L2 is the distance from the center of rotation of the pin 32 to a line passing through the detection part of the end surface 34a of the curved portion 34 parallel to the direction in which the pressure boss 33 protrudes.

When a check CK travels through the middle transportation path M and passes between the MICR 13 and pressure boss 33 of pressure lever 30, the pressure lever 30 moves circularly clockwise in FIG. 6 in resistance to the urging force of the pressure spring.

The resulting displacement D of the end surface 34a of the pressure lever 30 is proportional to the thickness d of the check CK. The paper thickness sensor 40 detects the distance between end surface 34a and the photodetector 40a of the paper thickness sensor 40, and acquires thickness d from the detected displacement D to detect double feeding.

The structure of the MICR detection apparatus is described next.

Figure 8:
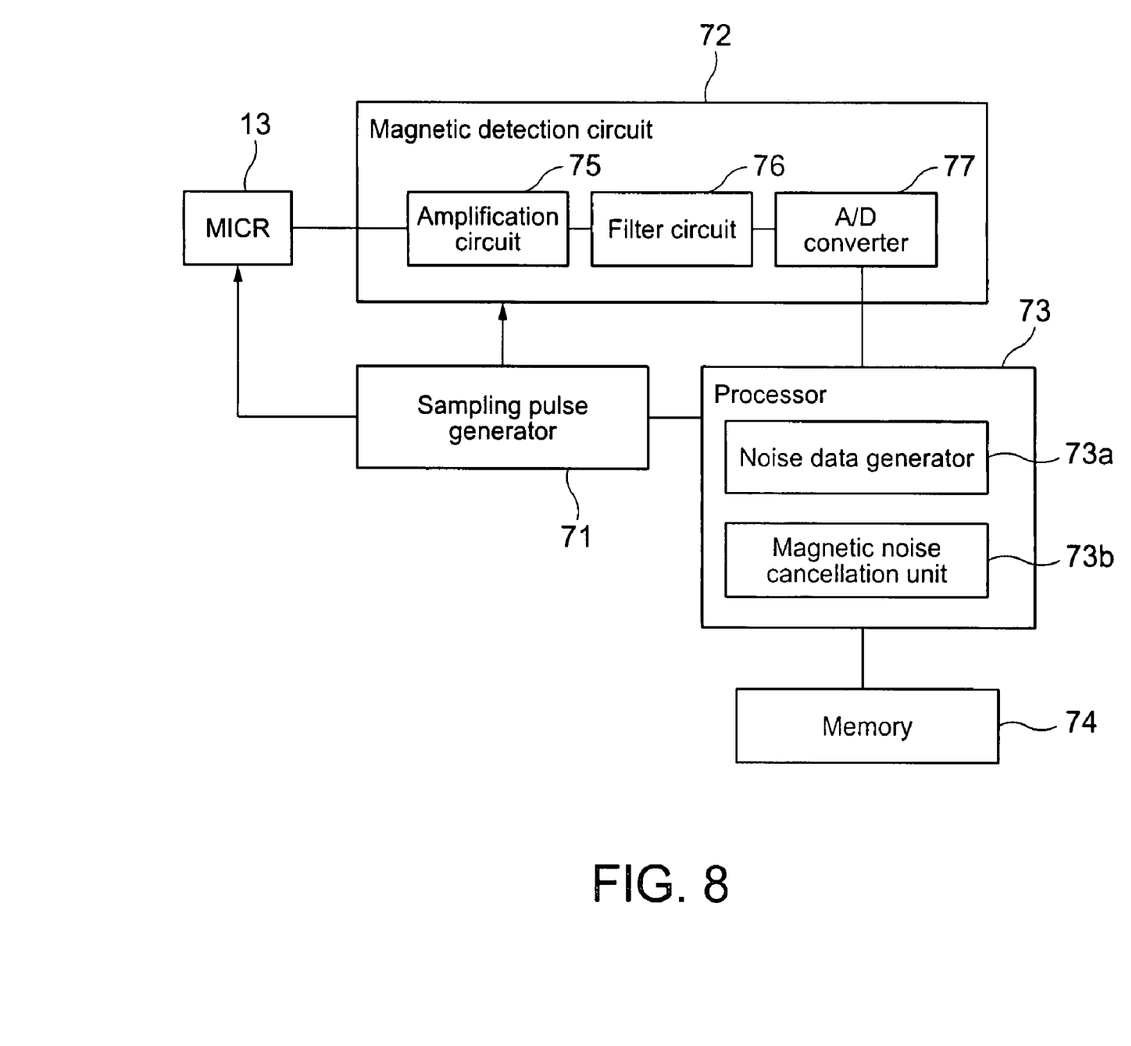
FIG. 8 is a block diagram showing the major components of an MICR apparatus.

FIG. 8 is a block diagram schematically showing the structure of the MICR detection apparatus. The MICR 13 shown in FIG. 8 picks up small changes in the magnetic flux density as a voltage signal.

The sampling pulse generator 71 is a circuit for generating sampling pulses for sampling the signals read by the MICR 13. These sampling pulses are output from before the check CK passes over the MICR 13, and are output to sample MICR 13 output when a check CK is not present. Sampling pulses are also output as the check CK passes over the MICR 13.

The magnetic detection circuit 72 applies a specific process to the pickup signal output from the MICR 13 and generates a magnetic detection signal. The magnetic detection circuit 72 is composed of an amplification circuit 75 for amplifying the pickup signal, a filter circuit 76 for removing unnecessary frequency components from the amplified output, and a A/D converter 77 for digitizing filter circuit 76 output.

The A/D converter 77 is synchronized to the stepping motor drive pulse, and generates and outputs a plurality of sampling signals for each drive pulse as an MICR character detection signal.

The processor 73 controls the operation of the other parts of the hybrid processing apparatus 1. More specifically, the processor 73 reads and runs firmware stored in ROM to control paper transportation, reading, and printing operations. More specifically, the processor 73 realizes the noise data generator 73a and magnetic noise cancellation unit 73b described below by running the firmware during the magnetic ink character reading process.

Memory 74 is a storage unit for storing the data and program necessary for processor 73 operation.

The processor 73 captures and stores the magnetic detection signal generated by the magnetic detection circuit 72 in memory 74. The noise data generator 73a of the processor 73 generates magnetic noise data. The magnetic noise removed by the magnetic noise cancellation process of this embodiment includes magnetic noise from the stepping motor and magnetic noise from the LED drive signal of the paper thickness sensor 40 (see FIG. 11).

After the processor 73 generates the magnetic noise data, the magnetic noise cancellation unit 73b applies the magnetic noise cancellation process to remove magnetic noise contained in the magnetic detection signal. This cancellation process periodically subtracts the magnetic noise data from the magnetic detection signal synchronized to the phase.

More specifically, the noise data generator 73a generates noise data based on the magnetic detection signals acquired before the check CK passes the magnetic detection unit (MICR 13). The magnetic detection signal acquired before the check CK passes over the MICR 13 (magnetic detection unit) corresponds to the data shown in period A in FIG. 11A, for example. The MICR 13 reads the magnetic ink characters MIC printed on the check CK as shown in FIG. 7 from the right end of the check CK, and this period A corresponds to the data read by the MICR 13 before the right end of the check CK reaches the reading surface 13a of the MICR 13. Magnetic noise from the stepping motor and magnetic noise from the LED of the paper thickness sensor 40 are superimposed on the background level in this period. The noise data generator 73a considers the period of the detection signal while generating the magnetic noise data from the detection signal in this period A.

Figure 9:
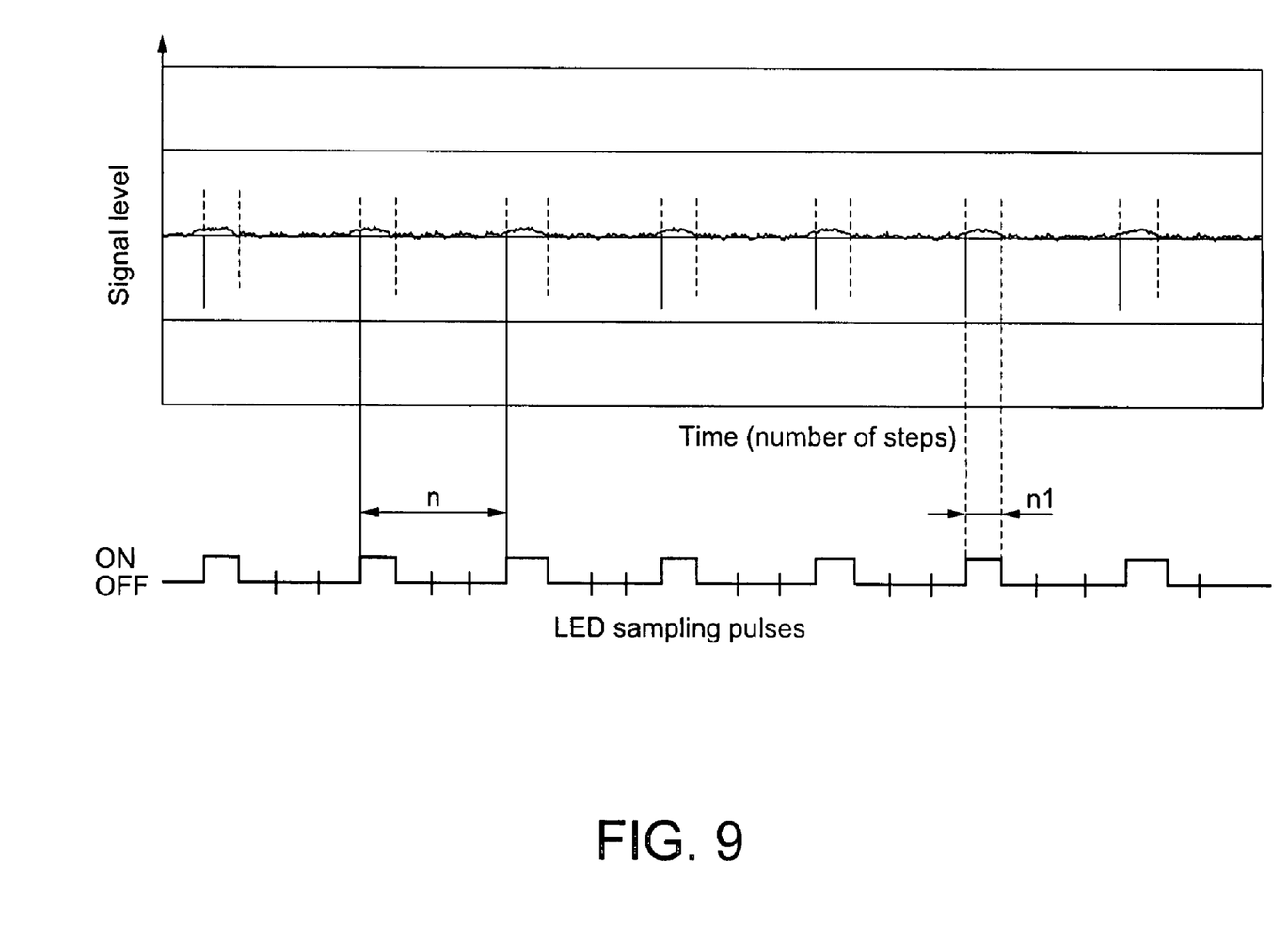
FIG. 9 is a waveform diagram describing magnetic noise from the LED drive signal.

FIG. 9 describes magnetic noise from the LED drive signal. The top part of FIG. 9 shows the waveform after magnetic noise from the stepping motor has been removed from the magnetic detection signal with the sampling level shown on the y-axis and time (number of steps) on the x-axis. The bottom part of FIG. 9 shows the LED drive timing of the paper thickness sensor 40 with the drive signal level shown in the y-axis and time (number of steps) on the x-axis.

As shown in FIG. 9, the LED is controlled in cycles of n steps with the LED going ON every step n1. In this example the LED repeatedly turns on for one step (sampling pulse) and off for three steps. Substantially rectangular wave shaped magnetic noise is superimposed on the magnetic detection signal corresponding to the ON periods of the LED. If the drive period of the stepping motor is m steps, magnetic noise data with a period equal to the least common multiple N of m and n can be generated to cancel magnetic noise from both the stepping motor and LED. In the example shown in FIG. 9 this least common multiple N is equal to the output cycle n of the LED.

The noise data generator 73a in this embodiment of the present invention therefore stores data corresponding to the output cycle of the LED as the magnetic noise data. Magnetic noise data is generated in this embodiment by extracting a plurality of magnetic noise data at the LED output timing from the magnetic detection signal, and obtaining the average of the plural magnetic noise data at each detection time starting from the beginning of the data train.

The magnetic noise cancellation unit 73b then removes the magnetic noise by a software operation subtracting the magnetic noise data generated by the noise data generator 73a from the magnetic detection signal stored in memory 74 synchronized to the phase at each period.

The procedure whereby the magnetic noise is removed from the magnetic detection signal is described further below with reference to the flow chart in FIG. 10.

Figure 10:
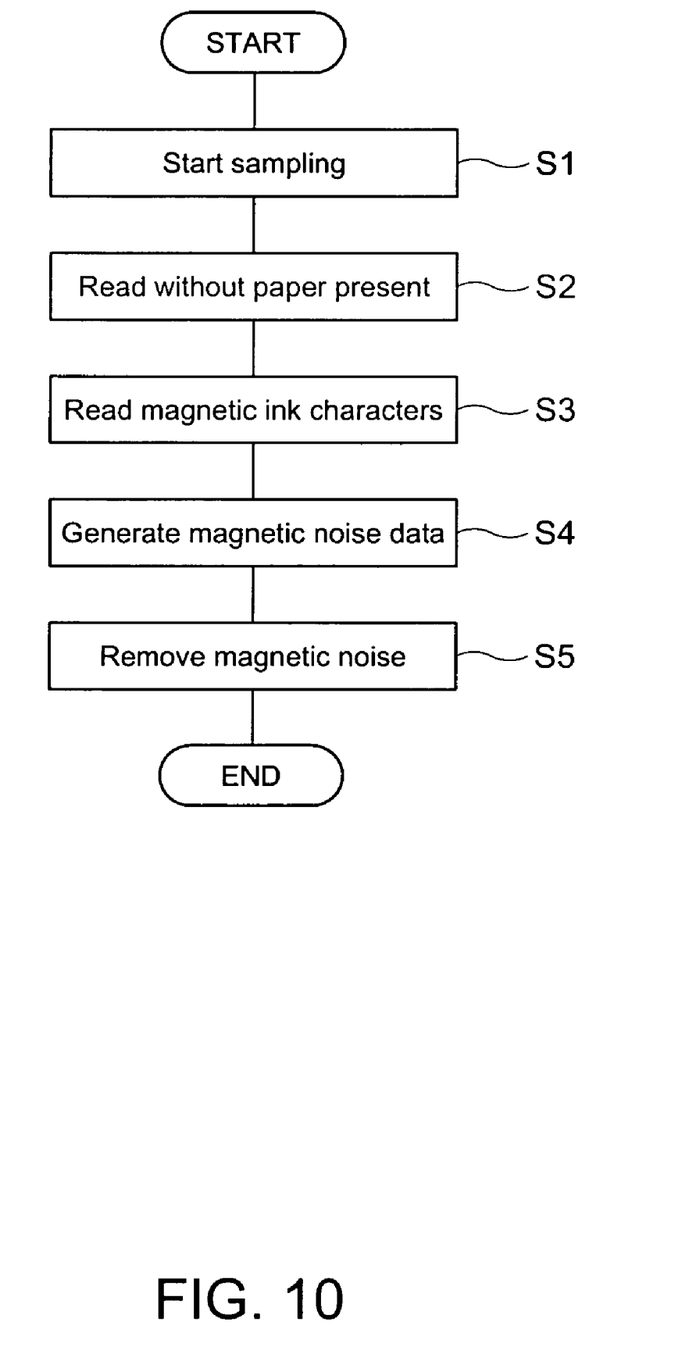
FIG. 10 is a flow chart of the magnetic noise cancellation process.

FIG. 10 is a flow chart summarizing this magnetic noise cancellation process.

The processor 73 first drives the sampling pulse generator 71 to start reading the magnetic ink character; signals from the MICR 13 (step S1). Sampling pulse output starts before the check CK to be read has reached the reading surface 13a of the MICR 13, and thus results in reading the magnetic ink character signal from an area where there is no paper, that is, the magnetic ink character signal is read at the background level (step S2).

When the check CK reaches the reading surface 13a of the MICR 13, the MICR 13 reads the magnetic ink characters from the check CK (step S3). All magnetic ink character signals read in steps S2 and S3 are stored to memory 74. The LED of the paper thickness sensor 40 is also driven at this time to simultaneously acquire paper thickness data.

Of the magnetic ink character signals stored in memory 74, the noise data generator 73a then reads the magnetic ink character signals read in step S2, extracts data with a period equal to the least common multiple N of the stepping motor drive period m and the LED output period n, and saves this data as the magnetic noise data. To acquire the average, data is acquired for several periods N, the average is calculated at each period starting from the beginning of the data stream, and the average is saved as the magnetic noise data (step S4).

The magnetic noise cancellation unit 73b then removes the magnetic noise by a software operation subtracting the magnetic noise data generated by the noise data generator 73a from the magnetic detection signals stored in memory 74 synchronized to the phase at each period, and saves the resulting noise-cancelled magnetic detection signal in memory 74 (step S5).

During the subsequent character recognition by the hybrid processing apparatus 1, signal patterns from the noise-cancelled magnetic detection signal are evaluated by a character recognition unit not shown to read and recognize the characters. Note that the hybrid processing apparatus 1 could send the noise-cancelled magnetic detection signals to a host computer that controls the hybrid processing apparatus 1, and the host computer could run the character recognition process.

As described above, a hybrid processing apparatus 1 that is a magnetic ink character reading apparatus according to this embodiment of the present invention has a transportation mechanism for conveying checks CK having magnetic ink characters printed thereon, a double feed detection mechanism 50 for detecting double feeding by detecting the thickness of the check CK using a paper thickness sensor 40 (photodetector) having an LED, a MICR 13 for detecting magnetic ink characters on the check CK and generating a magnetic detection signal, a noise data generator 73a for generating magnetic noise data by accumulating magnetic detection signals before the check CK passes the MICR 13, and a magnetic noise cancellation unit 73b for removing magnetic noise by subtracting the magnetic noise data from the magnetic detection signal.

In addition to removing magnetic noise from a stepping motor, this embodiment of the present invention can thus remove magnetic noise resulting from the LED drive current of the double feed detection mechanism that is left by the magnetic noise cancellation process of the prior art by thus accumulating magnetic detection signals before the check CK passes the MICR 13 and generating magnetic noise data therefrom. The present invention thus advantageously helps improve the magnetic ink character recognition rate. As a result, the present invention is admirably suited to application in compact hybrid apparatuses in which it is difficult to provide space between the magnetic head and other electronic components.

More particularly, both magnetic noise from motors and magnetic noise from photodetectors can be simultaneously removed by generating the magnetic noise data with a period equal to the least common multiple of the stepping motor control period and the photodetector control period. The invention thus helps improve the magnetic ink character recognition rate and magnetic ink character detection accuracy.

The present invention has been described with reference to a hybrid processing apparatus 1 by way of example only and shall not be so limited. More particularly, the invention can be applied in any magnetic ink character reading apparatus with the same benefits and advantages.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A magnetic ink character reading apparatus comprising:
   a transportation mechanism for conveying paper having magnetic ink characters printed thereon;
   a magnetic detection unit for detecting magnetic ink characters on said paper and generating magnetic detection signals;
   a magnetic noise data generating unit for generating magnetic noise data by accumulating magnetic detection signals before said paper passes said magnetic detection unit, wherein the magnetic noise data is a function of a control period of said transportation mechanism and a control period of a photodetector located adjacent to the magnetic detection unit; and
   a magnetic noise cancellation unit for removing magnetic noise by subtracting said magnetic noise data from said magnetic detection signals.

2. The magnetic ink character reading apparatus of claim 1, wherein said transportation mechanism is a stepping motor and further comprising a double feed detection mechanism for detecting double feeding by detecting the thickness of said paper using said photodetector.

3. The magnetic ink character reading apparatus as described in claim 2, wherein said magnetic noise data is generated based on a control period of said stepping motor and a control period of said photodetector.

4. The magnetic ink character reading apparatus as described in claim 3, wherein the period of said magnetic noise data is equal to the least common multiple of the control period of said stepping motor and the control period of said photodetector.

5. The magnetic ink character reading apparatus as described in claim 1, wherein said magnetic noise data is generated by acquiring a plurality of magnetic noise data from magnetic detection signals before said paper passes aid magnetic detection unit, and then acquiring an average of said plural magnetic noise data at each detection position starting from a first magnetic noise data.

6. The magnetic ink character reader of claim 1, wherein said magnetic ink character apparatus sends magnetic noise data with removed magnetic noise to a host computer to perform character recognition.

7. The magnetic ink character reader of claim 1, further comprising a pressure lever configured to be in contact with the magnetic detection unit when paper is not disposed therebetween and configured to be displaced when paper is disposed between the pressure lever and the magnetic detection unit, the pressure lever being spaced a distance apart from the photodetector.

8. The magnetic ink character reader of claim 7, wherein the pressure lever further comprises a LED located on an end surface thereof, adjacent to the photodetector, and further wherein the magnetic noise cancellation unit is configured to cancel magnetic noise from the stepping motor and the LED by way of a noise removing interval that is equal to a least common multiple of a drive period of the stepping motor and steps of a cycle of the LED.

9. The magnetic ink character reader of claim 1, wherein the photodetector is configured to operate periodically.

10. The magnetic ink character reader of claim 1, wherein a detection position of the photodetector and a detection position of the magnetic detection unit are substantially similar.

11. A magnetic ink character reading apparatus comprising:
- a stepping motor for conveying paper having magnetic ink characters printed thereon;
- a double feed detection mechanism for detecting double feeding by detecting the thickness of said paper using a photodetector;
- a magnetic detection unit for detecting magnetic ink characters on said paper and generating magnetic detection signals, the magnetic detection unit located adjacent to the double feed detection mechanism;
- a magnetic noise data generating unit for generating magnetic noise data by accumulating magnetic detection signals before said paper passes said magnetic detection unit based on the control period of said stepping motor and the control period of said photodetector, wherein the period of said magnetic noise data is equal to the least common multiple of the control period of said stepping motor and the control period of said photodetector; and
- a magnetic noise cancellation unit for removing magnetic noise by subtracting said magnetic noise data from said magnetic detection signals.

12. The magnetic ink character reader of claim 11, wherein the double feed detection mechanism further comprises a pressure lever configured to be in contact with the magnetic detection unit when paper is not disposed therebetween and configured to be displaced when paper is disposed between the pressure lever and the magnetic detection unit, the pressure lever being spaced a distance apart from the photodetector.

13. The magnetic ink character reader of claim 11, wherein the double feed detection mechanism further comprises a LED located on an end surface thereof, adjacent to and spaced apart from the photodetector, and further wherein the magnetic noise cancellation unit is configured to cancel magnetic noise from the stepping motor and the LED by way of a noise removing interval that is equal to a least common multiple of a drive period of the stepping motor and steps of a cycle of the LED.

14. The magnetic ink character reader of claim 11, wherein the photodetector is configured to operate periodically.

15. The magnetic ink character reader of claim 11, wherein a detection position of the photodetector and a detection position of the magnetic detection unit are substantially similar.

* * * * *